(12) United States Patent
Hernandez et al.

(10) Patent No.: US 10,970,680 B1
(45) Date of Patent: *Apr. 6, 2021

(54) SYSTEMS AND METHODS FOR MONITORED SOCIAL MEDIA PARTICIPATION

(71) Applicant: United Services Automobile Association, San Antonio, TX (US)

(72) Inventors: Heather Hernandez, San Antonio, TX (US); D. Benjamin Schofield, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 99 days.

This patent is subject to a terminal disclaimer.

(21) Appl. No.: 15/651,701

(22) Filed: Jul. 17, 2017

Related U.S. Application Data

(63) Continuation of application No. 13/301,537, filed on Nov. 21, 2011, now Pat. No. 9,721,229.

(60) Provisional application No. 61/428,664, filed on Dec. 30, 2010.

(51) Int. Cl.
*G06Q 50/00* (2012.01)
*G06Q 10/10* (2012.01)

(52) U.S. Cl.
CPC ........... *G06Q 10/101* (2013.01); *G06Q 50/01* (2013.01)

(58) Field of Classification Search
CPC .............................. G06Q 10/101; G06Q 50/01
See application file for complete search history.

(56) References Cited

U.S. PATENT DOCUMENTS

| 7,275,083 | B1* | 9/2007 | Seibel | G06Q 30/02 705/14.39 |
| 2006/0190365 | A1* | 8/2006 | Stewart, III | G06Q 20/102 705/30 |
| 2008/0177834 | A1* | 7/2008 | Gruhl | G06Q 10/00 709/204 |
| 2010/0205663 | A1* | 8/2010 | Ward | G06Q 50/01 726/7 |
| 2010/0223226 | A1* | 9/2010 | Alba | G06Q 30/02 706/55 |
| 2011/0137845 | A1 | 6/2011 | Ward | |
| 2011/0173198 | A1* | 7/2011 | Malleshaiah | G06F 16/337 707/737 |
| 2011/0231240 | A1* | 9/2011 | Schoen | H04L 51/32 705/14.41 |
| 2011/0276396 | A1* | 11/2011 | Rathod | H04L 12/18 705/14.49 |
| 2011/0282860 | A1* | 11/2011 | Baarman | G06F 16/951 707/709 |

(Continued)

*Primary Examiner* — Aftab N. Khan
(74) *Attorney, Agent, or Firm* — BakerHostetler

(57) ABSTRACT

Systems and methods to provide for social media monitoring and employee social media monitoring are described herein. In one example, a method includes a determining a score associated with a likelihood that a post on a social media network is associated with a trigger event. The post is transmitted to a computing device, based at least on the score. A response to the post is received from the computing device. An indication that the response is approved is received. The response is posted to the social media network, based at least on the indication that the response is approved.

20 Claims, 6 Drawing Sheets

(56) References Cited

U.S. PATENT DOCUMENTS

| | | | |
|---|---|---|---|
| 2012/0158843 A1* | 6/2012 | Angani | G06Q 30/02 |
| | | | 709/204 |
| 2012/0215639 A1* | 8/2012 | Ramer | G06Q 30/02 |
| | | | 705/14.53 |
| 2012/0266191 A1 | 10/2012 | Abrahamsson et al. | |
| 2012/0316916 A1* | 12/2012 | Andrews | G06Q 40/08 |
| | | | 705/7.28 |
| 2013/0073389 A1* | 3/2013 | Heath | G06Q 50/01 |
| | | | 705/14.54 |
| 2016/0081134 A1* | 3/2016 | Chow | G06Q 30/0282 |
| | | | 455/419 |

* cited by examiner

SYSTEMS AND METHODS FOR MONITORED SOCIAL MEDIA PARTICIPATION

CROSS REFERENCE TO RELATED APPLICATIONS

This application is a continuation of U.S. patent application Ser. No. 13/301,537, filed Nov. 21, 2011, which claims the benefit of U.S. Provisional Patent Application No. 61/428,664, filed on Dec. 30, 2010, the benefit of priority of which is claimed hereby. U.S. patent application Ser. No. 13/301,537 and U.S. Provisional Patent Application No. 61/428,664 are incorporated by reference herein in their entirety.

TECHNICAL FIELD

This application relates to systems and methods that provide monitoring services and more particularly, systems and methods that provide for monitored social media participation.

BACKGROUND

Customers demand more from the products and services than ever before. They insist that the companies they deal with on a regular basis provide them greater and greater levels of information and access. As the pace of society quickens, customers' expectations for instant interactions with companies require more robust tools for customer service.

SUMMARY

A method for monitored media participation may comprise determining a score associated with a likelihood that a post on a social media network is associated with a trigger event. The score may be determined by analyzing the post for keywords, such as using simple string searching, latent semantic analysis, or probabilistic latent semantic analysis. The score may be determined, for example, using an algorithm, such as a sentiment algorithm, a classification algorithm, a clustering algorithm, or a recommendation algorithm. Based at least on the score, the post may be transmitted. The post may be transmitted to a computing device. A response to the post may be received, such as from the computing device. An indication that the response to the post is approved may be received, such as from the computing device or from another computing device. Based at least on the indication that the response is approved, the response may be posted to the social media network. As another example, a method for monitored media participation may comprise determining scores indicative of a likelihood that a post on a social media network is associated with each of a plurality of trigger events. Based at least on the scores, the post may be transmitted to a recipient associated with one of the plurality of trigger events. A response to the post may be received, such as from the recipient. The response may be posted to the social media network.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF ILLUSTRATIVE EMBODIMENTS

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may he made without departing from the scope of this description.

Social networks refer to social structures made up of individuals (or organizations) called "nodes", which are tied (connected) by one or more specific types of interdependency, such as friendship, kinship, common interest, and the like. As used herein, "social networks" reform to those interconnections between users of a computer-implemented network, such as the Internet Examples of social networks include, without limitation, FACEBOOK™, TWITTER™, MYSPACE™ WIKIPEDIA™ LINKEDIN™ YOUTUBE™, FLICKR™, WORDPRESS™ blogs, BLOGSPOT™ Blogs, and the like.

The systems and methods described herein relate to monitoring activities within the social media space. In an embodiment, social media is a term used to describe the variety of social networks on which users interact with each other. Social media is media used for social interaction, which use highly accessible and scalable publishing techniques. Social media allows for the creation and exchange of user-generated content (UGC). Social media represents the blending of technology and social interaction for the co-creation of value. Social media differs from traditional media (such as newspapers, television, and the like) in its relatively low speaking cost (e.g., a "tweet" costs nothing, while even a local cable access TV show costs hundreds or even thousands of dollars to produce) and its accessibility. This allows all customers to have a voice, and it is becoming more imperative that business begin listening to this voice.

Figure 1:
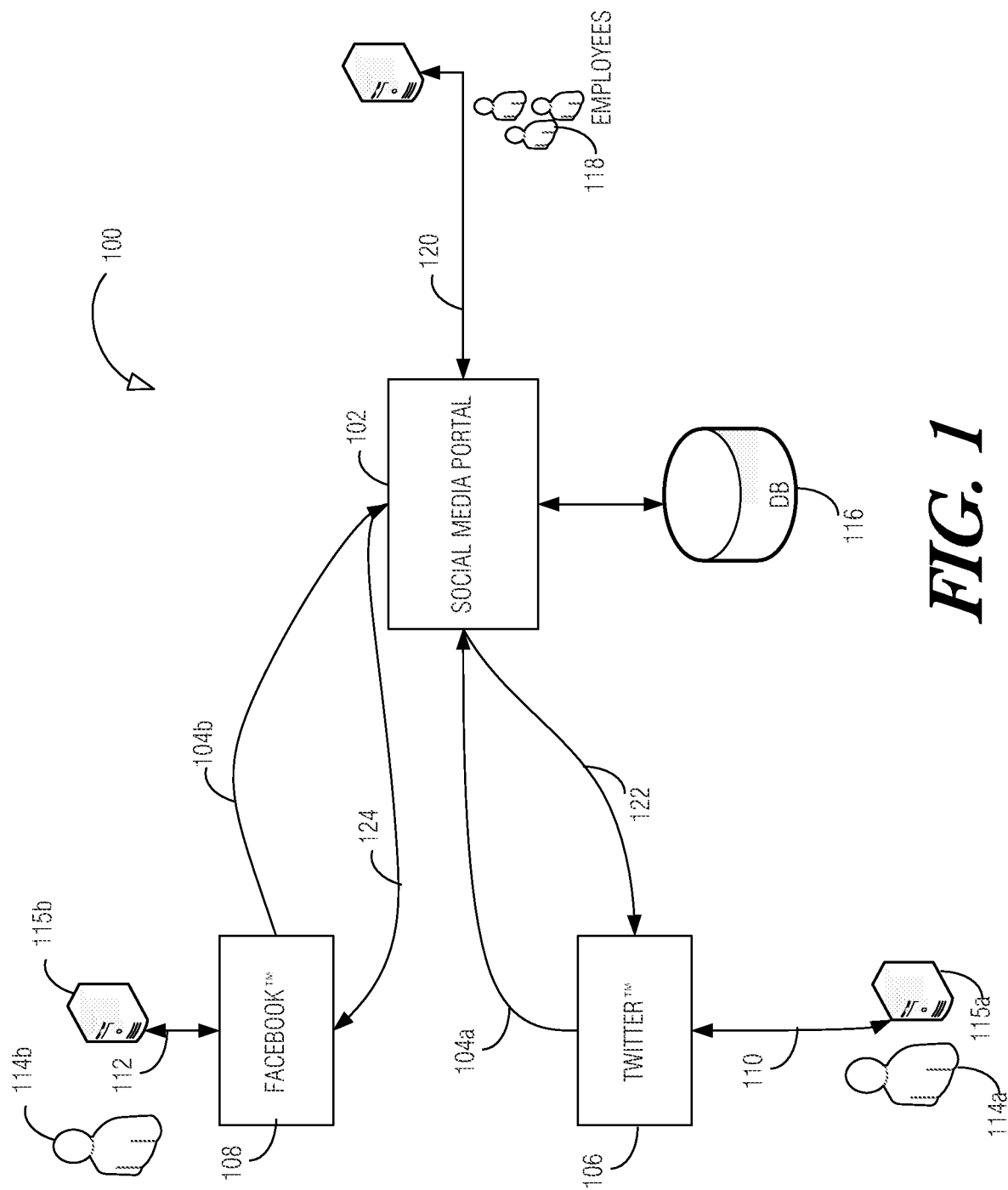
FIG. 1 shows a high-level block diagram of a system for providing social media monitoring services, in accordance with an example embodiment.

FIG. 1 shows a high-level block diagram of a system 100 for providing social media monitoring services of social media postings, in accordance with an example embodiment In an embodiment, a social media posting includes content (e.g., a string of alphanumeric characters, a picture, a movie, a song, etc.) that may be shared among a plurality of users of a social media community.

In an embodiment, system 100 includes social media portal 102 and incoming social media streams 104a, 104b. Social media streams 104a, 104b are retrieved from a plurality of social media communities, such as TWITTER™

106 or FACEBOOK™ 108. In an embodiment, social media streams 104*a*, 104*b* are an aggregation of individual social media postings, such as individual tweets 110 or wall postings 112 that have been posted by users 114*a*, 114*b* using computing devices 115*a*, 115*b*. Computing devices 115*a*, 115*b* may include, but are not limited to, personal computers, personal digital assistants, mobile phones, tablet devices, and laptop computers.

In an embodiment, social media portal 102 is configured to receive social media streams 104*a*, 104*b* of social media postings and perform analysis operations on the social media postings. In an example embodiment, social media portal 102 is configured to access (e.g., though a network using an Application Programming Interface (API) call) social media streams 104*a*, 104*b* and replicate those streams to an internally managed database 116. In various embodiments, database 116 may retain a certain period of postings from the social media streams 104*a*, 104*b*. In an embodiment, social media streams 104*a*, 104*b* are filtered according to defined criteria. The criteria may include any combination of subject matter (e.g., keywords), demographics (e.g., age, gender, occupation), temporal restrictions (e.g., within the past two weeks), and geographic restrictions (e.g., city, state, zip code, a five mile radius). For example, one set of criteria may filter social media postings by posts that originate from Texas, are affiliated with the military, and are from users of ages 20-25. The database 116 may be implemented in a number of ways including, but not limited to flat file and relational databases. In various embodiments, other types of persistence storage are used.

In an embodiment, analysis includes performing textual analysis on the content of a social media posting to determine a context of the social media posting. In an embodiment, social media portal 102 classifies a social media posting according to a plurality of trigger events. For example, trigger event categories may include life events, complaint events, and insurance events.

In an embodiment, the trigger events generate one or more leads that may be handled by employees of the operator of social media portal 102. For example, a sales lead may be generated by a trigger event based on detecting that a user is unhappy with his or her current insurance carrier. In another example, a customer service lead may be generated for complaint event triggers when it is determined the complaint is about the operator of social media portal 102. In an embodiment, claim leads are generated for insurance events. The leads may be routed to an employee of the operator of social media portal 102 based on the trigger event. The employee may then take a number of actions depending on the lead. For example, the employee may send a response social media posting when the lead is a customer service lead.

In an embodiment, social media portal 102 is configured to enable one or more employees 118 to post social media postings to the social networks through a single point of entry. In such an example, employee 118 is employed by the same entity operating the social media portal 102. Alternatively, social media portal 102 may be operated by a third party providing monitoring services. In either case, it may be advantageous for the employer of the employees 118 to be apprised of the employees 118 interactions 120 with social networks as those interactions may include statements about the employer that are regulated by one or more governmental agencies.

Additionally, it may be advantageous as the employer seeks to maintain a consistent message about the company, both in traditional media and in social networks. In an embodiment, each employee 118 interaction 120 is passed through social media portal 102, in an example, and validated against one or more rules. The interaction 120 is then directed to the appropriate social network. For example, employee 118 tweets 122 are directed to the TWITTER™ network and become part of the cloud of TWITTER™ tweets 106; and employee 118 wall postings are directed to the FACEBOOK™ network and become part of the cloud of FACEBOOK™ wall postings 108.

The interactions between the social networks and social media portal 102 may be made by way of application programming interfaces (API). These APIs may be public, in that any software developer may access them and the documentation describing them is available to all APIs may also be private in that access and documentation are provided to those persons who have some contractual relationship with the network operator. Further, access to the networks may be through a combination of public and private APIs as appropriate. Other access methods are possible, however, and may be used as well to provide additional functionality to social media portal 102.

Mention of FACEBOOK™ and TWITTER™ are merely illustrative of two example social networks that are used, but the systems and methods described herein are not necessarily limited to them, and any social network that provides the ability to a user to provide comments and participate in an aggregated conversation about anything is considered to be within the scope of the present invention.

Figure 2A:
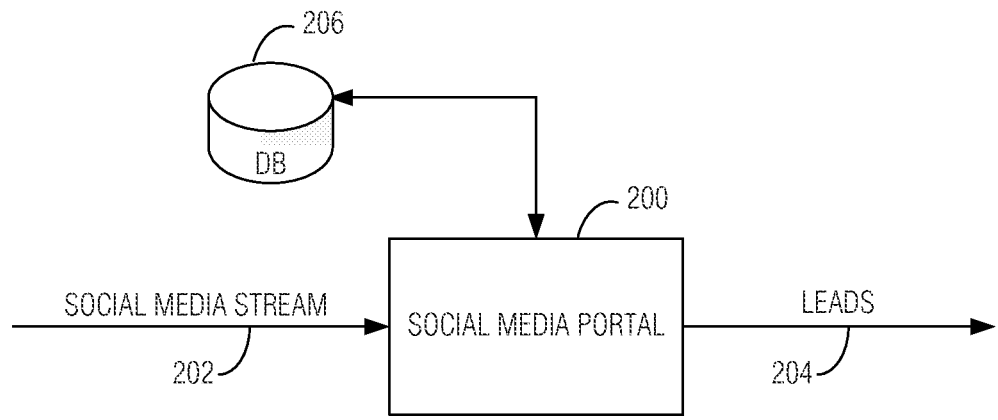
FIGS. 2A-2B show high level block diagrams of apparatus for social media stream monitoring, in accordance with example embodiments.

FIG. 2A shows a high level block diagram of an apparatus for social media stream monitoring, in accordance with an example embodiment. In an example, social media portal (SMP) 200 is configured to receive social media stream 202 and output lead 204. In further examples, social media portal 200 may be configured to output additional information as described above. Social media portal 200 is communicatively coupled, in an example, to database 206 that may be used to store social media postings. The social media postings may include interactions with one or more social networks as described above. In an embodiment, database 206 is configured to maintain multiple different interactions.

Figure 2B:
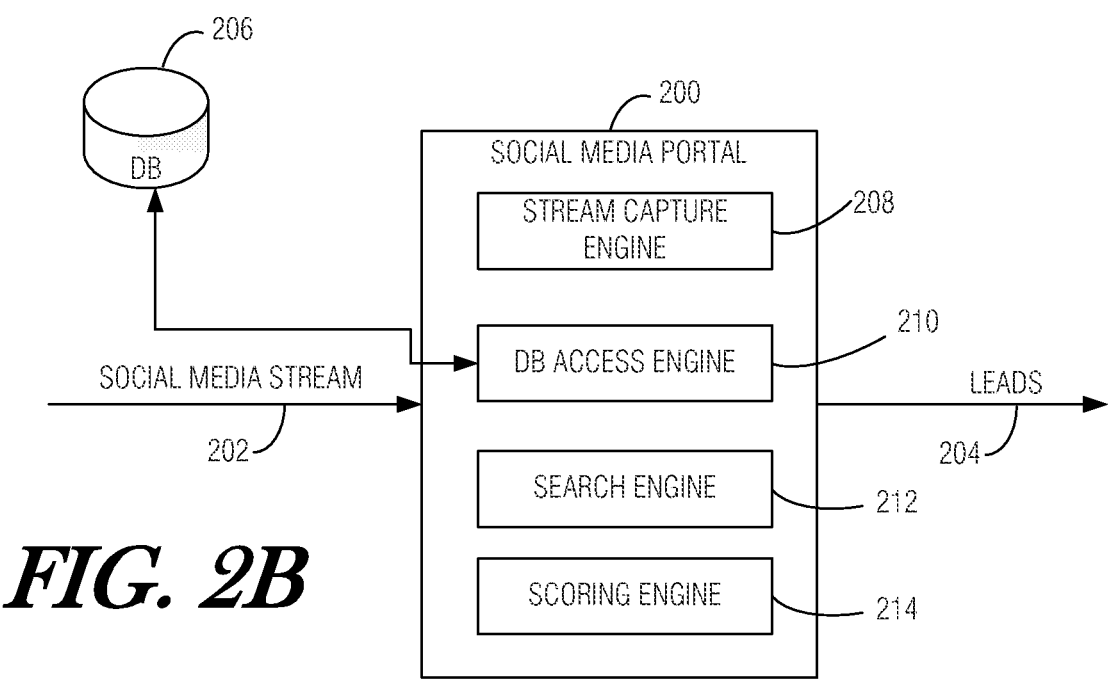

FIG. 2B illustrates a more detailed block diagram of SMP 200 described above in FIG. 2A. In an example, SMP 200 includes stream capture engine 208, database access engine 210, search engine 212, and scoring engine 214.

Stream capture engine 208 is configured, in one example, to access through APIs or other suitable methods, one or more social network streams 202. The stream capture engine 208 may include functionality to monitor the streams of all social networks monitored by the operator of SMP 200. Alternatively, SMP 200 may include a plurality of stream capture engines 208 with each engine configured to access a single social network. This may be advantageous for the purposes of load balancing as well as scalability.

Database access engine 210, in an example, is communicatively coupled to stream capture engine 208 and database 206. In an embodiment, database access engine 210 is configured to receive a stream of social media postings from stream capture engine 208 and store the social media postings in database 206. Additionally, database access engine 210 may be configured to retrieve information from database 206 or provide database query capability to search engine 212 or scoring engine 214.

Search engine 212 is configured to provide searching capability to SMP 200. In an embodiment, users (e.g., employees) may search social media postings stored in database 206 using a variety of criteria, including but not limited to, user, location (e.g., of the user of the social media post or location of the device which sent the social media posting), keyword, or trigger event. For keyword searching, search engine 212 may be completed using any number of suitable text search and parsing methods, including, but not limited to, simple string searching, latent semantic analysis (LSA), probabilistic latent semantic analysis (PLSA), or any other text based analysis method. Additionally, search engine 212 may be augmented by other search analysis types, such as image, audio or video search capabilities. These latter types may be of utility to the operator of the SMP 200 if their customers use sites like YOUTUBE™ or FLICKR™.

Other machine learning algorithms may also be used to filter search results such as classification, clustering, and recommendation algorithms. These algorithms may be seeded and modified with the help of users of the social media portal. For example, through the use of a sentiment algorithm the social media posts may be classified as positive or negative with respect to a company (e.g., whether the post contains a complaint about the company. A user of the social media portal may view the initial results according to the existing sentiment algorithm and indicate whether a post that was classified as negative was, in fact, positive. In this manner, the sentiment algorithm will be more accurate in the future.

In an embodiment, the results of a search are filtered. For example, social media posts which exceed a defined confidence level may be shown in a results page. In an embodiment, the results are formatted as follows:

<Score, Source, Time, Owner, Contents>

In an embodiment, the score represents the calculated similarity (e.g., confidence level) between the search criteria and the social media posting. The source is the name of the social media site (e.g., social network such as FACEBOOK™) from which the social media posting originated. The time is the time the social media postings were posted (e.g., any combination of year, month, day, hour, minute second, time zone). In an embodiment, the owner is the handle of the account which posted the social media posting to the social network. In an embodiment, a user may click on the owner's name to retrieve the owner's (e.g., customer) history of social media postings. In an embodiment, the contents of the social media posting are included in the search results.

In an embodiment scoring engine 214 scores social media postings according to trigger events. For example, trigger event categories may include life events, complaint events, and insurance events. Life events may include events such as birth of a child, death of a family member, moving to a new house, starting a new job, buying a new car, and being fired from a job. Complaint events may include events such as slow claims processing, improper claims processing, and complaints and about existing insurance coverage. Insurance events may include events such as being in a car accident, domicile damage, theft, and death of an insured. The labels of the trigger event categories are exemplary in nature and various embodiments may use more or less event trigger categories. In an embodiment, the trigger events are stored in database 206 as a series of keywords and business rules that are used to determine the likelihood of a trigger event. For example, a new car trigger event may be stored as a rule that says a social media posting that includes the phrase "I just bought a new car" indicates a high likelihood of a new car purchase. In various embodiments, a similarity algorithm is used to determine the likelihood of a trigger event based on stored phrases and keywords for a trigger event. A social media posting may also be scored using similar text search methods or machine learning algorithm as described with respect to search engine 212.

In various embodiments when trigger events are included in search results, a representation (e.g., a qualitative or quantitative measurement) of the likelihood of the occurrence of the trigger event being related to the social media posting is displayed concurrently with the contents of the social media posting and a representation of the trigger event (e.g., a description of the trigger event) are included in the search results. In an embodiment, each social media posting is scored according to a set of trigger events as it passes through SMP 200. In an embodiment, social media postings are scored for trigger events when requested by a user of SMP 200.

In an embodiment, lead 204 or the social media posting itself may be routed to a recipient based on the output of scoring engine 214. For example, a social media post may be scored for a plurality of trigger events. In an embodiment, the highest score represents the greatest likelihood the trigger event is associated with the social media posting. Then, a lead may be generated depending on which trigger event is calculated to have the highest score. For example, a social media posting may be scored as 0.3 (e.g., 30% similar) with respect to phrases/keywords associated with for a car accident trigger event and 0.5 for a new car trigger event. Because the new car trigger event was higher, a sales lead may be generated. The social media posting may then be routed to an employee of the operator of SMP 200 to follow-up. Additional scoring may also be done to further refine the current lead. For example, the post may be scored with respect to sentiment as described above. Then, if the new car trigger event also is scored as negative, the post may be passed to a customer service representative as well as the sales department.

In various embodiments, social media postings that have been scored are recorded as entries in a social media posting queue indicating which trigger event the social media posting is associated with. In an embodiment, the calculated likelihood is compared to a threshold value to determine whether to route the lead or social media posting. For example, social media postings that do not have a calculated likelihood of at least 0.2 may not be routed to anyone.

In various embodiments, routing the social media posting to a recipient includes presenting the recipient with a user interface for responding to the social media message. In an embodiment, the user interface includes an option of which social media account to respond from, a text box for entering a message, an option to make the message private or public, a reference to the social media message, and an option to retrieve other social media postings from the poster of the social media posting.

Figure 3A:
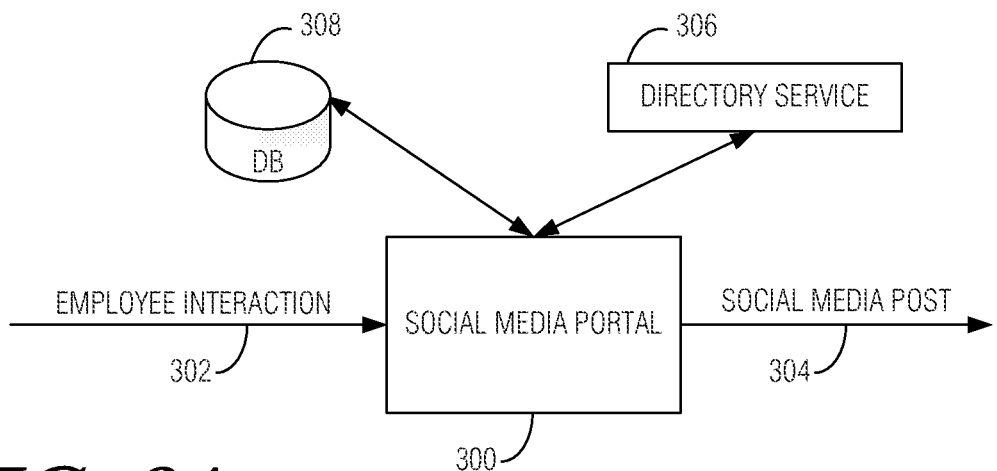
FIGS. 3A-3B show high level block diagrams of apparatus for employee social media interaction monitoring, in accordance with example embodiments.

FIG. 3A shows a high level block diagram of an apparatus for employee social media interaction monitoring, in accordance with an example embodiment. The social media portal (SMP) 300 is configured to receive one or more employee interactions 302 and enable posting of one or more social media posts 304 on the appropriate social network. In an embodiment, an interaction is a response social media posting. In an embodiment, response means the posting is a direct response to a social media posting (e.g., a complaint) or response may mean in response to a trigger event or lead. SMP 300 is communicatively coupled to directory service 306 and database 308. Directory service 306 provides authentication and verification services, in an example, to SMP 300. The directory service may include, without limitation, lightweight directory access protocol (LDAP), X.500, eDirectory, Red Hat Directory Server, Open Directory, Apache Directory Server, NT Domains, NetInfo, OpenLDAP, and the like.

Figure 3B:
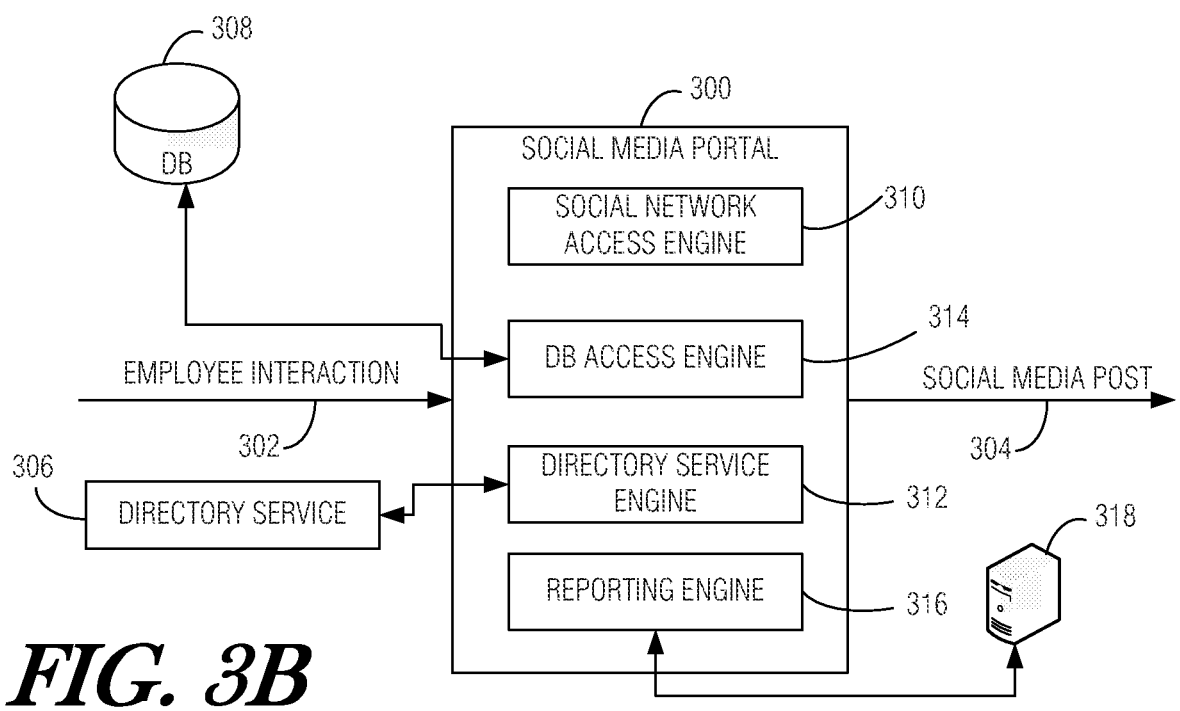

FIG. 3B illustrates a more detailed block diagram of social media portal 300 described above. In an example, social media portal (SMP) 300 includes social network access engine 310, directory service engine 312, database access engine 314, and reporting engine 316. In a further example, reporting engine 316 may be communicatively coupled through a suitable network to a user computer 318 such that the user may monitor the one or more employee interactions 302 received by SMP 300.

In an example, social network access engine 310 is configured post a social media posting to a social network on behalf of an employee. This may be through APIs as described above, or through other suitable methods. Similar to stream capture engine 208 described above, social network access engine 310 may represent a plurality of social network access engines 310 in which each of the plurality are configured to post to a single social network. In various embodiments, social network access engine 310 is configured to comply with regulatory guidelines for posting on social networks. For example, social network access engine 310 may add #EMP to any tweets that are sent from employees of the operator of SMP 300.

In an example, directory service engine 312 is configured to access an available directory service 306 to authenticate employees and verify the privileges of the user. In the context of the SMP 300, the directory service engine 312 allows various controls on the interactions of employees. For instance, employees in the research and development department may be prohibited from posting from work on FACEBOOK™, while those employees in customer service are allowed to. In various embodiments, the privileges include which social media accounts an employee is authorized to post from. For example, a customer service employee may be authorized to post from an official customer service account. In various embodiments, employees are authorized to respond to certain trigger events and leads. For example, a sales employee may be authorized to respond to sales leads.

Directory service engine 312 may also provide differing retention procedures and policies depending on the employee. Employees in highly regulated industries such as financial planning may have their interactions stored in a custom configured data store which provides audit and reporting capabilities for government regulators. Additionally, those employees may have their interactions maintained in a pending status until a supervisor approves the content. Through this type of additional structure, an investment company may maintain the rigor and control required.

The database access engine 314 is configured, in an example, to receive the employee interactions (e.g., a response message) and store them in database 308. In an embodiment, entries in database 308 are formatted as follows:

<User, Site, Account, Post, Time>

In an embodiment, "User" is an identification of the employee (e.g., a user id) that was authenticated and initiated the interaction, "Site" is the social network which the interaction was directed, Account is the social media account that was used to post to the social network, "Post" is an identification number of the interaction, and "Time" is the time the interaction was posted to the social network (any combination of year, month, day, hour, minute second, time zone). Additionally, the database access engine 314 may provide query capability to the reporting engine 316 such that users may analyze the postings of employees. In an embodiment, database 308 is an audit database.

The reporting engine 316 is configured to provide, in an example, to users one or more views, or reports, on the interactions of users, through access by the user computer 318. These views, or reports, provide to the company an audit capability as well as satisfying various regulations that govern the company's interactions with customers. In the United States, these regulations are promulgated by the Federal Trade Commission (FTC). The SMP 300, in one example, is meant to provide the type of monitoring required by the FTC.

Though depicted separately in FIG. 1, FIGS. 2A-2B, and FIGS. 3A-3B, the various social media portals described may be combined into a single platform, engine or software module, or hardware system such that customer service and employee monitoring are provided for in a single place. However, the systems and methods described herein are not limited to either implementation and are limited only by the claims provided below.

Figure 4:
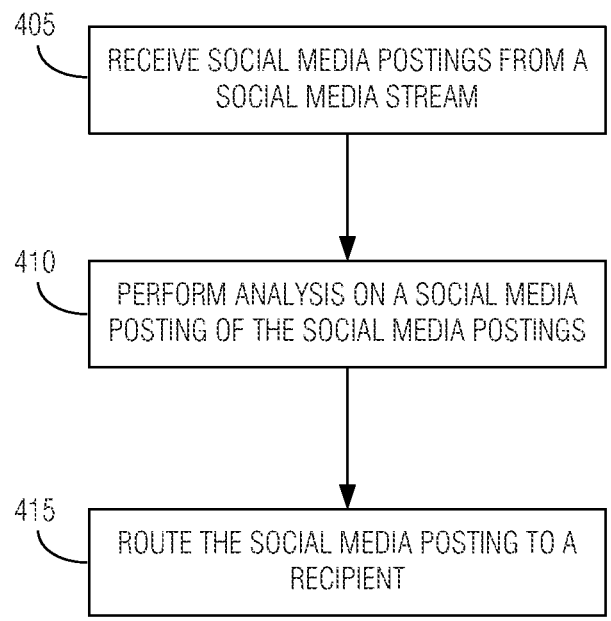
FIG. 4 shows a flowchart of a method of social media lead generation, in accordance with an example embodiment.

FIG. 4 shows a flowchart of a method of social media lead generation, in accordance with an example embodiment. The operations depicted in FIG. 4 may be carried out on the apparatus or systems described above, in some examples.

At block 405, the system receives a stream of social network postings. This may be accomplished in some examples, by utilizing public or private API's provided by the operator of that social network. In other examples, this may be accomplished using other data extraction methodologies such as screen scraping, for example. This stream may be stored in a database for later operations. The database may store a certain period of postings, such as the last 30 days or a longer period of time. Though it may be possible using these systems to store these streams indefinitely, old information may not be as useful as newer information, and storing a smaller amount of information may result in increased system performance. In an embodiment, the social media postings are retrieved from a storage device on a social media portal.

The stream of postings may be filtered according to social media posts concerning an affinity group (e.g., common group of users). For example, the filtering may be done through any variety of means, such as just the followers of a company, or the followers of another entity, or the listed friends, or all of the individuals who indicate they like a particular topic. To illustrate this, the operator of this system may wish to monitor social network streams related to the US Navy. They could choose to capture all of the content posted by people who follow @USNavy on TWITTER™ as well as related TWITTER™ accounts, such as @CVN70 (TWITTER™ feed for USS Carl Vinson CVN-70), @AmericanLegion (TWITTER™ feed for the American Legion), @DeptofDefense (TWITTER™ feed for the US Department of Defense), etc. Through the monitoring of these streams one may get a sense of the sentiment of these particular users as opposed to the sentiments of the general population. In various embodiments, the postings may also be filtered by particular individuals/customers. In this manner, a user of SMP may see a history of the social media posts of particular customer.

At block 410, the text of one or more social media postings within the social media stream is analyzed. In an embodiment, analysis includes scoring the social media postings for trigger events as described herein (e.g., using scoring engine 214). In various embodiments, analysis may be looking for the occurrence of the word "baby" in a posting and incrementing the baby counter by one to note how many particular people are talking about babies. Using the above example, one could see through this analysis if a US Navy supporting company needs to spend more time discussing their baby-related products. Or a company that specializes in the relocation of Navy sailors could determine that a specific sailor needs help in finding a new home following a permanent change of station (PCS) move through that sailor's posting that says "just got my PCS orders and off to San Diego I go." Though simple string analysis may be quicker, other textual analysis and contextual analysis may be performed to get different results. Methodology such as LSA and PLSA may provide more context and sentiment than just simple text strings, though simple text strings remain a quick method of performing the analysis of the stream.

At block 415, a social media posting is routed to a recipient based on the analysis (e.g., scoring) indicating a trigger event. The trigger event may be associated with one or more leads. In an embodiment, a level of user access required for responding to a trigger event is determined and then the recipient is determined based on a level of use access granted to the recipient and the level of access required for responding to the trigger event. With respect to leads, continuing the examples above, the first company may decide to start marketing more baby-centric items. In the second example, that relocation company may reach out directly to that sailor and tell them about the great relocation services they offer.

In various embodiments, after the social media posting is routed to the user, the SMP may receive an indication that the user responded to the first social media posting with a response message. Thereafter, an entry may be recorded in an audit database indicating the first social media posting has been responded to by the user.

Figure 5:
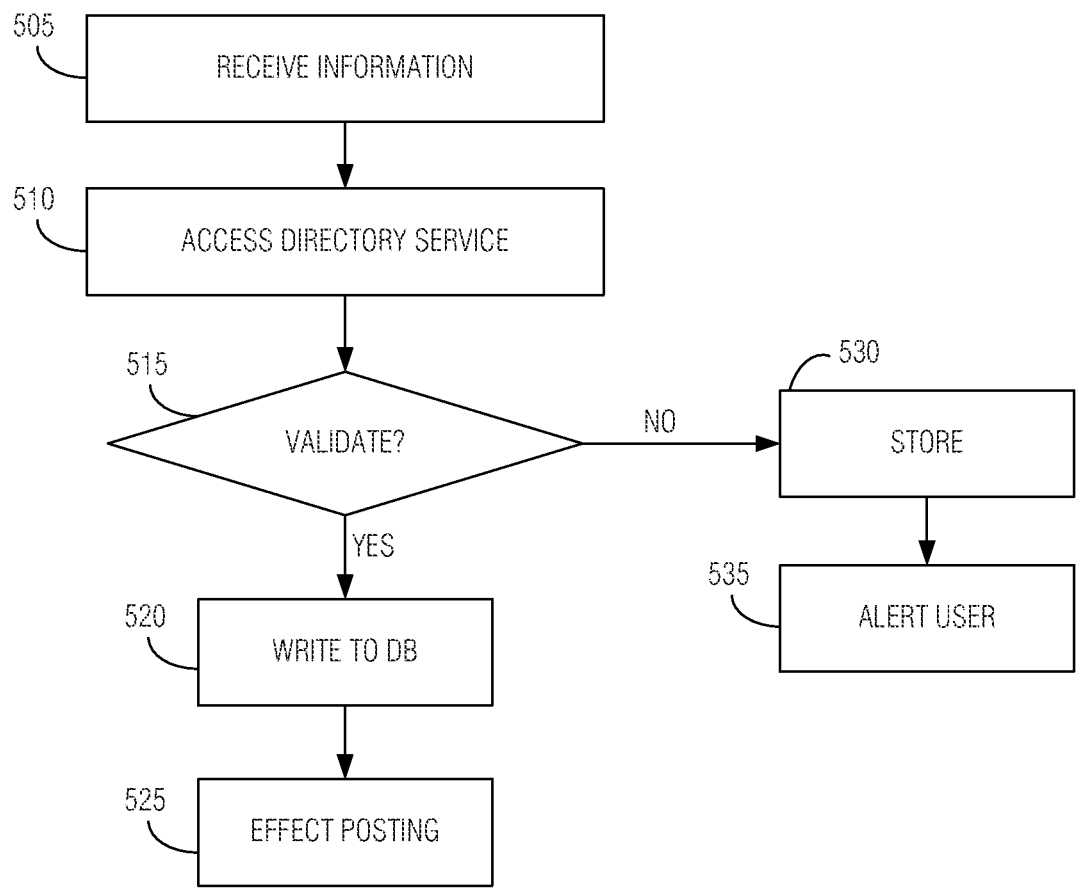
FIG. 5 shows a flowchart of a method of employee social media interaction monitoring, in accordance with an example embodiment.

FIG. 5 shows a flowchart of a method of employee social media interaction monitoring, in accordance with an example embodiment. The operations depicted in FIG. 5 may be carried out on the apparatus or systems described above, in some examples.

At block 505, the system receives an employee interaction. This interaction may be through a dedicated software client on the employee's machine or through a web interface on the employer's intranet. This type of entry point may be of particular use when the employee is actually using the company's network, either by being physically at the employer's building or accessing it through a virtual private network (VPN). Though the employer may promulgate other methods of accessing the system, these systems seem to be of particular value in that integration with various security mechanisms may occur and the employee may be directed to these systems and away from publicly available methods, such as directly interacting with FACEBOOK™.

At block 510, the system accesses a directory service as described above to perform one or more authentication and validation exercises. At block 515, the employee is validated against that directory service. If the employee is authorized to post, their posting is written to a database at block 520. At block 525, the system effects the posting through any of the methods already described.

If the employee is not validated by the directory service at block 515, the posting is stored in the database at block 530. The employee may be notified at block 535. Additionally, system administrators may be alerted that an unauthorized employee has attempted to post something to a social network so that appropriate action may be taken.

In addition to the validation operations described here, the system could perform any of the textual analysis described above with the intent of determining trends associated with employees as well as employee sentiment about any variety of topics.

Figure 6:
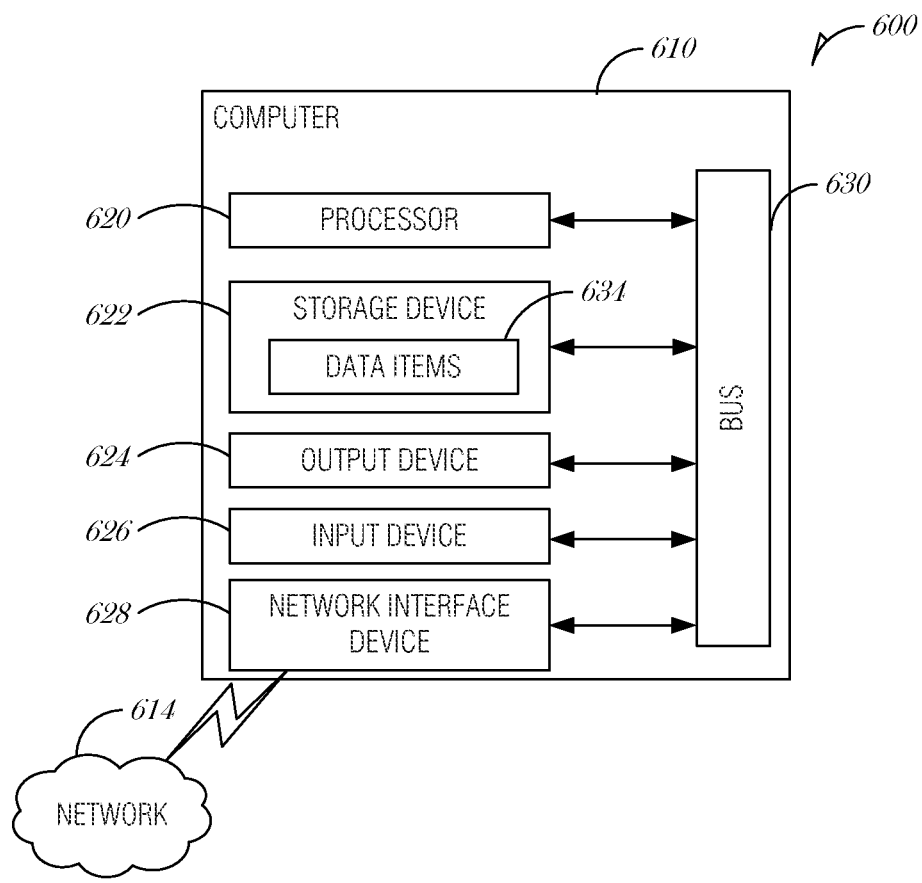
FIG. 6 shows a block diagram of a machine including instructions to perform any one or more of the methodologies described herein.

FIG. 6 shows a block diagram of a machine including instructions to perform any one or more of the methodologies described herein. System 600 includes computer 610 connected to network 614. Computer 610 includes processor 620, storage device 622, output device 624, input device 626, and network interface device 628, all connected via bus 630. Processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 620 executes instructions and includes that portion of computer 610 that controls the operation of the entire computer. Although not depicted in FIG. 6, processor 620 typically includes a control unit that organizes data and program storage in memory and transfers data and other information between the various parts of computer 610. Processor 620 receives input data from input device 626 and network 614, reads and stores code and data 634 in storage device 622, and presents data to output device 624.

Although computer 610 is shown to contain a single processor 620 and a single bus 630, the disclosed embodiment applies equally to computers that may have multiple processors and to computers that may have multiple busses with some or all performing different functions in different ways.

Storage device 622 represents one or more mechanisms for storing data. For example, storage device 622 may include read-only memory (ROM), random access memory (RAM), magnetic disk storage media, optical storage media, flash memory devices, and/or other non-transitory machine-readable media. In other embodiments, any appropriate type of storage device may be used. Although one storage device 622 is shown, multiple storage devices and multiple types of storage devices may be present. Further, although computer 610 is drawn to contain storage device 622, storage device 622 may be distributed across other computers, for example on a server.

Storage device 622 includes a controller (not shown in FIG. 6) and data items 634. The controller includes instructions capable of being executed on processor 620 to carry out the functions, as previously described above with reference to FIGS. 1-5. In another embodiment, some or all of the functions are carried out via hard ware in lieu of a processor-based system. In one embodiment, the controller is a web browser, but in other embodiments the controller may be a database system, a file system, an electronic mail system, a media manager, an image manager, or may include any other functions capable of accessing data items. Of course, storage device 622 may also contain additional software and data (not shown), which is not necessary to understand the invention.

Although the controller and the data items 634 are shown to be within storage device 622 in computer 610, some or all of them may be distributed across other systems, for example on a server and accessed via network 614.

Output device 624 is that part of computer 610 that displays output to the user. Output device 624 may be a liquid crystal display (LCD). In embodiments, output device 624 may be a gas or plasma-based flat-panel display or a traditional cathode-ray tube (CRT) display. In other embodiments, any appropriate display device may be used. Although one output device 624 is shown, in other embodiments any number of output devices of different types, or of the same type, may be present. In an embodiment, output device 624 displays a user interface.

Input device 626 may be a keyboard, mouse or other pointing device, trackball, touchpad, touch screen, keypad, microphone, voice recognition device, or any other appropriate mechanism for the user to input data to computer 610 and manipulate the user interface previously discussed. Although one input device 626 is shown, in another embodiment any number and type of input devices may be present.

Network interface device 628 provides connectivity from computer 610 to network 614 through any suitable communications protocol Network interface device 628 sends and receives data items from network 614.

Bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

Computer 610 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of computer 610. For example, other peripheral devices such as audio adapters or chip programming devices, such as EPROM (Erasable Programmable Read-Only Memory) programming devices may be used in addition to, or in place of, the hardware already depicted.

Network 614 may be any suitable network and may support any appropriate protocol suitable for communication to computer 610. In an embodiment, network 614 may support wireless communications. In another embodiment, network 614 may support hard-wired communications, such as a telephone line or cable. In another embodiment, network 614 may support the Ethernet IEEE (Institute of Electrical and Electronics Engineers) 802.3x specification. In another embodiment, network 614 may be the Internet and may support IP (Internet Protocol). In another embodiment, network 614 may be a local area network (LAN) or a wide area network (WAN). In another embodiment, network 614 may be a hotspot service provider network. In another embodiment, network 614 may be an intranet. In another embodiment, network 614 may be a GPRS (General Packet Radio Service) network. In another embodiment, network 614 may be any appropriate cellular data network or cell-based radio network technology. In another embodiment, network 614 may be an IEEE 802.11 wireless network. In still another embodiment, network 614 may be any suitable network or combination of networks. Although one network 614 is shown, in other embodiments any number of networks (of the same or different types) may be present.

The embodiments described herein may be implemented in an operating environment comprising software installed on any programmable device, in hardware, or in a combination of software and hardware.

For the pm1Joses of this specification, the terms "machine-readable medium" or "computer-readable medium" shall be taken to include any tangible non-transitory medium which is capable of storing or encoding a sequence of instructions for execution by the machine and that cause the machine to perform any one of the methodologies described herein. The terms "machine-readable medium" or "computer-readable medium" shall accordingly be taken to include, but not be limited to, solid-state memories, and optical or magnetic disks. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, bard disks, removable magnetic disks, removable optical disks (e.g., compact disks and digital video disks), magnetic cassettes, memory cards or sticks, random access memories (RAM's), read only memories (ROM's), and the like.

In various embodiments, the methods and system described herein may be implemented on one or more modules or engines. In an embodiment, one module or one engine may be implemented as multiple logical modules, or several modules may be implemented as a single logical module. As another example, modules labeled as "first," "second," and "third," etc., may be implemented in a single module, or in some combination of modules, as would he understood by one of ordinary skill in the art. Modules and engines may constitute either software modules (e.g., code embodied (1) on a non-transitory machine-readable medium or (2) in a transmission signal) or hardware-implemented modules or engines. A hardware-implemented module or engine is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module or engine that operates to perform certain operations as described herein.

Various modifications and changes may be made to the embodiments described herein without departing from the broader spirit and scope of the invention. Accordingly, the specification and drawings are to be regarded in an illustrative rather than a restrictive sense. The accompanying drawings that form a part hereof: show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed:

1. A system comprising:
a processor; and
memory comprising computer-readable instructions that, when executed by the processor, cause the processor to effectuate operations comprising:
monitoring social media stream using a social media portal (SMP) by receiving the social media stream and an output lead, wherein the social media portal is coupled to a database used for storing social media posts, wherein the SMP comprises at least a stream capture engine, a database access engine, a search engine, and a scoring engine;
determining that a post of the social media posts on a social media network is associated with a trigger event by determining a plurality of scores associated with the likelihood that a plurality of posts on the social media network are associated with the trigger event, wherein the score represents calculated similarity between search criteria and the social media posts, and wherein the trigger event comprises life events, complaint events and insurance events;
routing, the social media posts based on output of the scoring engine, wherein a highest score represents a greatest likelihood the trigger event is associated with a social media post;
generating a lead depending on which trigger event is calculated to have the highest score;
filtering, using classification, clustering and recommendation machine learning algorithms, based at least on the plurality of scores, the plurality of social media posts;
transmitting a request for a response to the filtered plurality of social media posts;
transmitting, based at least on the determining that the social media post is associated with the trigger event and to a computing device, the post;
receiving, from the computing device, an indication of a social media account;
adding the response to a data store comprising a plurality of responses to the plurality of posts; and
posting, based at least on the plurality of responses being approved, the plurality of responses to the social media network under the social media account.

2. The system of claim 1, wherein the post was identified by filtering a social media stream from the social media network.

3. The system of claim 1, wherein the trigger event comprises at least one of a complaint, an event associated with insurance, an event associated with purchase of a vehicle, an event associated with purchase of real estate, or an event associated with a family member.

4. The system of claim 1, wherein posting the plurality of responses response is further based at least on an authentication or a verification of a sender of the response to the post.

5. The system of claim 1, wherein the determining that the post is associated with the trigger event comprises determining a plurality of scores associated with a likelihood that the plurality of social media posts on the social media network are associated with the trigger event; and
further comprising filtering, based at least on the plurality of scores, the plurality of posts and transmitting a request for the response, wherein the response comprises a response for the filtered plurality of posts.

6. The system of claim 5, wherein filtering the plurality of posts is further based at least on one or more sources of the plurality of posts.

7. A method comprising:
monitoring social media stream using a social media portal (SMP) by receiving the social media stream and an output lead, wherein the social media portal is coupled to a database used for storing social media posts, wherein the SMP comprises at least a stream capture engine, a database access engine, a search engine, and a scoring engine;
determining that a post of the social media posts on a social media network is associated with a trigger event by determining a plurality of scores associated with the likelihood that a plurality of posts on the social media network are associated with the trigger event, wherein the score represents calculated similarity between search criteria and the social media posts, and wherein the trigger event comprises life events, complaint events and insurance events;
routing, the social media posts based on output of the scoring engine, wherein a highest score represents a greatest likelihood the trigger event is associated with a social media post;
generating a lead depending on which trigger event is calculated to have the highest score;
filtering, using classification, clustering and recommendation machine learning algorithms, based at least on the plurality of scores, the plurality of social media posts;
transmitting a request for a response to the filtered plurality of social media posts;
transmitting, based at least on the determining that the social media post is associated with the trigger event and to a computing device, the post;
receiving, from the computing device, an indication of a social media account;
adding the response to a data store comprising a plurality of responses to the plurality of posts; and
posting, based at least on the plurality of responses being approved, the plurality of responses to the social media network under the social media account.

8. The method of claim 7, wherein the recipient comprises a provider of services associated with the one of the plurality of trigger events.

9. The method of claim 7, wherein the determining that the post is associated with the trigger event comprises using at least one of a sentiment algorithm, a classification algorithm, a clustering algorithm, or a recommendation algorithm.

10. The method of claim 7, wherein the determining that the post is associated with the trigger event is based at least on further comprising receiving a classification of at least one score indicative of a calculated similarity between search criteria and the post of the scores; and
updating, based at least on the classification, the least one of the sentiment algorithm, the classification algorithm, the clustering algorithm, or the recommendation algorithm.

11. The method of claim 7, wherein the determining that the post is associated with the each of the plurality of trigger event events comprises analyzing the post for keywords associated with at least one of the plurality of trigger events.

12. The method of claim 11, wherein analyzing the post for keywords comprises at least one of simple string searching, latent semantic analysis (LSA), or probabilistic latent semantic analysis (PLSA).

13. The method of claim 7, further comprising replicating a social media stream to a database; wherein the post was obtained from the database.

14. The method of claim 13, wherein replicating the social media stream and posting the response to the social media network comprise interacting with the social media network using an application programming interface.

15. A non-transitory computer-readable medium storing instructions, when executed by a processor, cause the processor to:
monitor social media stream using a social media portal (SMP) by receiving the social media stream and an output lead, wherein the social media portal is coupled to a database used for storing social media posts, wherein the SMP comprises at least a stream capture engine, a database access engine, a search engine, and a scoring engine;
determine that a post of the social media posts on a social media network is associated with a trigger event by determining a plurality of scores associated with the likelihood that a plurality of posts on the social media network are associated with the trigger event, wherein the score represents calculated similarity between search criteria and the social media posts, and wherein the trigger event comprises life events, complaint events and insurance events;
route, the social media posts based on output of the scoring engine, wherein a highest score represents a greatest likelihood the trigger event is associated with a social media post;
generate a lead depending on which trigger event is calculated to have the highest score;
filter, using classification, clustering and recommendation machine learning algorithms, based at least on the plurality of scores, the plurality of social media posts;
transmit a request for a response to the filtered plurality of social media posts;
transmit, based at least on the determining that the social media post is associated with the trigger event and to a computing device, the post;
receive, from the computing device, an indication of a social media account;
add the response to a data store comprising a plurality of responses to the plurality of posts; and
post, based at least on the plurality of responses being approved, the plurality of responses to the social media network under the social media account.

16. The non-transitory computer-readable medium of claim 15, wherein the instructions, when executed by the processor, further cause the processor to determine the approval of the response based at least on an authorization of a sender of the response.

17. The non-transitory computer-readable medium of claim 15, wherein the instructions cause the processor to determine the score using at least one of a sentiment algorithm, a classification algorithm, a clustering algorithm, or a recommendation algorithm.

18. The non-transitory computer-readable medium of claim 15, wherein the instructions, when executed by the processor, further cause the processor to monitor a social media stream for posts comprising a search criteria; and wherein the post was identified by monitoring the social media stream.

19. The non-transitory computer-readable medium of claim 18, wherein the search criteria comprises at least one of a user, a location, or a keyword.

20. The non-transitory computer-readable medium of claim 18, wherein monitoring the social media stream comprises performing audio, image, or video analysis.

* * * * *